J. H. BLACK.
Clod-Crusher.
No. 63,200.
Patented Mar. 26, 1867.
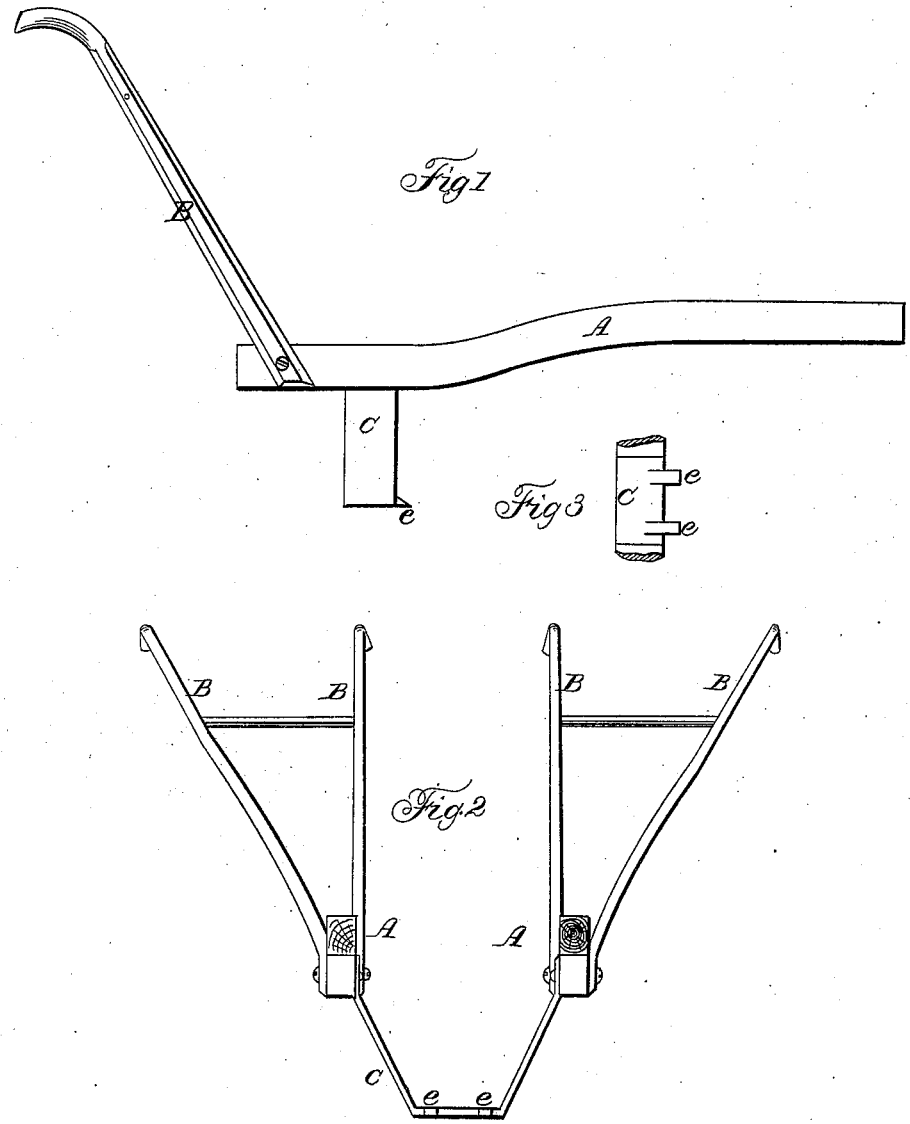

United States Patent Office.

JOSEPH H. BLACK, OF EAST WINDSOR, NEW JERSEY.

Letters Patent No. 63,200, dated March 26, 1867.

IMPROVEMENT IN TREE DIGGERS.

*The Schedule referred to in these Letters Patent and making part of the same.*

TO ALL WHOM IT MAY CONCERN:

Be it known that I, JOSEPH H. BLACK, (assignor to WILLIAM and EBENEZER GILBERT, Jr., of Catskill, New York,) of East Windsor, in the county of Mercer, and in the State of New Jersey, have invented certain new and useful Improvements in "Tree Diggers;" and do hereby declare that the following is a full, clear, and exact description thereof, reference being had to the accompanying drawings, and to the letters of reference marked thereon.

In the annexed drawings, making part of this specification, A A represent two plough-beams, constructed in any of the known usual ways, and provided with suitable handles B B. C represents a metallic plate, which is either cast or wrought of any suitable metal, substantially in the form herein seen. The forward edge of this plate is sharpened so as to present a cutting edge to the soil and to the roots of the trees which it is intended to cut off. $e$ $e$ represent two plough-points, which are cast or secured upon the bottom of the plate. The two ends of this plate C are bolted or firmly secured to the insides of the beams A A. When the plate is secured to the beams, said beams stand at a sufficient distance apart to pass, one upon each side, of the row of trees to be dug up.

In using this machine a horse is secured to each of the beams, and one horse walks upon each side of the row of trees. The plate runs under the trees, cutting off the vertical and lateral roots, and leaving the trees standing to be pulled up at leisure. The plate can be so formed as to run as deep into the ground or as far from the trees as may be required.

Having thus fully described my invention, what I claim as new, and desire to secure by Letters Patent, is—

The employment of the plate C, constructed substantially as represented, and used in combination with the beams A A, as and for the purpose set forth.

In testimony that I claim the foregoing I have hereunto set my hand and seal this first day of February, 1867.

JOSEPH H. BLACK.

Witnesses:
  L. M. SCHANCK,
  J. S. ROGERS.